United States Patent [19]
Granberg

[11] Patent Number: 6,101,382
[45] Date of Patent: *Aug. 8, 2000

[54] TRANSFER OF CALLING PARTY IDENTIFICATION IN A MOBILE COMMUNICATION SYSTEM

[75] Inventor: Christer Granberg, Stockholm, Sweden

[73] Assignee: Telefonaktiebolaget LM Ericsson, Stockholm, Sweden

[*] Notice: This patent is subject to a terminal disclaimer.

[21] Appl. No.: 08/912,929

[22] Filed: Aug. 15, 1997

[51] Int. Cl.[7] .................................................. H04B 1/00
[52] U.S. Cl. ........................................ 455/414; 455/415
[58] Field of Search .................................. 455/433, 435, 455/445, 415, 417; 370/384, 385, 373

[56] References Cited

U.S. PATENT DOCUMENTS

| | | | |
|---|---|---|---|
| 5,504,804 | 4/1996 | Widmark et al. . | |
| 5,511,111 | 4/1996 | Serbetcioglu et al. . | |
| 5,553,130 | 9/1996 | Turner . | |
| 5,579,379 | 11/1996 | D'Amico et al. . | |
| 5,696,815 | 12/1997 | Smyk | 379/142 |
| 5,854,975 | 12/1998 | Fougnies et al. | 455/408 |
| 5,875,401 | 2/1999 | Rochkind | 455/456 |
| 5,907,803 | 5/1999 | Nguyen | 455/410 |
| 5,930,701 | 7/1999 | Skog | 455/415 |

FOREIGN PATENT DOCUMENTS

| | | |
|---|---|---|
| 0 627 862 A2 | 12/1994 | European Pat. Off. . |
| 0 699 009 | 2/1996 | European Pat. Off. . |
| 99/09760 | 2/1999 | WIPO .................. H04Q 7/00 |
| 99/14961 | 3/1999 | WIPO .................. H04Q 7/22 |

OTHER PUBLICATIONS

*Bell Labs Technical Journal*, Summer 1997, XP-000703738, pp. 20–19, Donna M. Hlavacek et al., "Alternative Methods for Introducing New Wireless Intelligent Network Services Using Triggers and Queries".

GSM Technical Specification, Digital Cellular Telecommunications System (Phase 2+); Customized Applications for Mobile Network Enhanced Logic (CAMEL)—Stage 2 (GSM 03.78), Version 5.0.0, European Telecommunications Standards Institute, Apr. 1997, pp. 1–77.

*Primary Examiner*—Reinhard J. Eisenzopf
*Assistant Examiner*—Makoto Aoki
*Attorney, Agent, or Firm*—Nixon & Vanderhye P.C.

[57] ABSTRACT

Reliable and comprehensive calling party identification services are provided to mobile subscribers. Calling party identification information, including for example public and private telephone numbers, is sent to a mobile database in a called party mobile network as part of an interrogation procedure for obtaining routing information for routing that call to the mobile subscriber in the PLMN. The mobile database then sends the calling party identification to a mobile switching center where the called mobile station is currently registered and being served as part of that interrogation procedure. The serving mobile switching center stores that calling party identification together with a roaming number allocated for the call. When the call is routed to the serving mobile switching center, the stored calling party identification is forwarded to the mobile unit along with call setup information and is ultimately presented to the mobile unit subscriber.

21 Claims, 6 Drawing Sheets

SRI = SEND ROUTING INFORMATION    PRN = PROVIDE ROUTING NUMBER

CPI = CALL PARTY IDENTIFICATION    IAM = INITIAL ADDRESS MESAGE

TRANSFER OF CALLING PARTY IDENTIFICATION IN A MOBILE COMMUNICATION SYSTEM

RELATED APPLICATIONS

This application is related to the following (all of which are incorporated herein by reference), U.S. patent application Ser. No. 08/964,212, entitled "Method and Apparatus for Providing Network Specific Mobile Services," filed Nov. 7, 1997; U.S. patent application Ser. No. 08/986,387, entitled "Method and Apparatus for Coordinating Mobile Communications Network Services With Intelligent Network-Based Services," filed Dec. 8, 1997; and U.S. patent application Ser. No. 08/971,735, entitled "Providing Notification of Location Dependent Services to Mobile Radios," filed Nov. 17, 1997.

FIELD OF THE INVENTION

The present invention relates to a system for providing individual supplementary subscriber services in a cellular mobile radio communications network. One example service to which the present invention is particularly directed is a calling party identification service for mobile radio subscribers.

BACKGROUND

In mobile radio communications networks, such as cellular telephone systems, neighboring radio cells provide coverage of the area to be serviced. Each cell has a base station (BS) operating on a set of radio channels. A group of base stations is controlled by a mobile switching center (MSC) which controls calls to and from the public switched telephone network (PSTN), integrated services digital network (ISDN), and public land mobile network (PLMN). The MSC typically handles switching, routing, and charging for calls.

It is desirable to provide mobile subscribers with supplementary services that typically require an individual subscription before that service can be invoked. One system in which such supplementary services may be provided is the Global System for Mobile communications (GSM). See for example, GSM technical specification 03.78, version 5.0.0, relating to Customized Applications for Mobile network Enhanced Logic (CAMEL) published by the European Telecommunications Standards Institute (ETSI).

Individual supplementary subscriber services may be divided into two types: those which modify or supplement the process of an originating call (referred to here as "A-subscriber services"), and those which modify or supplement the process of terminating (i.e., receiving) a call, (referred to here as "B-subscriber services"). The present invention is particularly concerned with B-subscriber services where call-related information is provided to the B-subscriber's mobile. One such call-related parameter is the telephone number or other identification of the calling party and is sometimes referred to as calling line identification presentation (CLIP).

While automatic number identification (ANI) services are known in fixed telephony networks, mobile telephony networks present unique challenges to reliably providing such identification to roaming mobile subscribers. In fact, to place a call which terminates at a mobile station whose location may be continually changing, plural databases are required in the mobile communications network for keeping track of mobile stations. For example, many mobile communications networks such as GSM employ a home location register (HLR) database node. The HLR stores the subscriptions of various mobile subscribers as well as the location of the mobile station. In particular, the HLR stores information that identifies the mobile switching center currently serving the present location of the mobile station. This information is updated as the mobile station moves around by having the mobile station register its location with the HLR by means of a mobile switching center (MSC). More specifically, when a mobile station roams into a new mobile switching center area, it registers with that new MSC, and the MSC requests data about the mobile station from the HLR. At the same time, the HLR is informed in which MSC area the mobile station is presently located. Consequently, when the mobile station places a call, the MSC already has the information necessary for call set-up without having to interrogate the HLR.

Also employed in monitoring the location of mobile stations is a visitor location register (VLR) which is associated (and normally co-located) with each MSC. The VLR contains temporary subscriber information needed by the MSC to provide service for visiting subscribers and can be seen as a "distributed" HLR. When a mobile station roams into a new MSC service area, the VLR associated with that MSC requests data about the mobile station from the HLR and stores it. In short, the VLR is used to service roaming mobile stations.

When a call is set up from an initial or gateway mobile switching, center where a mobile-destined call enters the mobile network, to the serving MSC/VLR, the calling party's number may not be provided or otherwise readily accessible. For example, when the called mobile subscriber is roaming in a visiting mobile network, it is often the case that the transit network carrying the call to the visited network either will not or cannot provide calling party information. There are also interconnect agreements between various communications carriers that do not include the transfer of calling party numbers.

There is an additional problem in that there is currently no provision for combining a calling party identification service within a virtual private network (VPN) private numbering plan. In particular, a private number associated with a mobile station in accordance with a VPN numbering plan (rather than a conventional length/formatted telephone number) is not transferred to the mobile switching center where the mobile subscriber is currently registered as part of the call set-up message information provided for a particular call. This problem is further exacerbated when VPN services extend across cellular provider networks or across international boundaries as described above.

SUMMARY OF THE INVENTION

It is therefore an object of the present invention to provide a reliable and comprehensive calling party identification service to mobile subscribers.

It is a further object of the present invention to provide an improved and more reliable method for transferring a calling party number to a mobile subscriber roaming in a foreign mobile communications network.

It is a further object of the present invention to provide a calling party identification service that identifies a caller to a mobile subscriber using a private number associated with a private numbering plan such as those used in private networks.

These and other objects are achieved by the present invention in at least part by sending calling party information, including public and private telephone numbers, to a mobile database in the called party mobile network as part of a routing interrogation procedure. The mobile database sends the calling party identification to a mobile switching center where the called mobile station is currently registered as part of that interrogation procedure. The mobile switching center stores that calling party identification together with a roaming number allocated for the call. When the call is routed to the mobile switching center, the stored calling party identification is forwarded to the mobile unit along with the call set-up information, and ultimately, presented by the mobile unit to the subscriber.

In a first example embodiment of the invention, the mobile communications network includes an initial routing node and one or more mobile switching nodes for directing calls to a plurality of mobile communication units. A mobile subscriber database is connected to the initial routing node and to the plurality of mobile switching nodes. When a call is placed from a calling party to one of the mobile communication units, a calling party identification of the calling party is detected at the initial routing node. A determination is made which of the mobile switching nodes is currently serving the called mobile communications unit. The calling party identification is sent as signaling information to the mobile subscriber database from the initial routing node. The calling party identification is then provided from the mobile subscriber database to the serving mobile switching node for delivery to the called mobile communications unit via a base station over a radio communications interface. More specifically, the mobile subscriber database may be a home location register (HLR) node storing mobile unit identification, subscription, and location information for a plurality of mobile units. Each mobile switching node is associated with a visiting location register (VLR) storing mobile unit identification, subscription, and location information for a plurality of those new mobile units.

In this way, the calling party identification service in accordance with the present invention reliably and effectively provides the necessary calling identification information across different mobile communications networks, even those that span more than one country, so that roaming subscribers are still effectively serviced.

Another example application of the present invention may be implemented in conjunction with a private numbering plan service where members of the private numbering plan, (including one or mobile communication units), communicate by dialing private calling numbers, e.g., so-called short numbers or extensions. A calling party identification service is provided such that when a call from a calling party is placed to one of the member mobile communications units, a private calling party number corresponding to the calling party is presented at the one mobile communications unit.

One application where such private numbering plans are often employed is in virtual private networks (VPNs) such as may be implemented using intelligent network (IN) type service logic. An initial service detection and routing node detects whether the call is directed to a member of the private numbering plan. If so, parameters related to the call are forwarded to a service logic node which translates an identification number associated with the call into the corresponding calling party private identification. The service logic returns the private calling party identification to the initial service and detection routing node. The private calling party identification is then sent to a mobile subscriber database. When the mobile switching node currently serving the called mobile communications unit is determined, the private calling party identification is forwarded from the mobile subscriber database to that serving mobile switching node for ultimate forwarding to the called mobile communications unit along with the call.

DETAILED DESCRIPTION OF THE DRAWINGS

In the following description, for purposes of explanation and not limitation, specific details are set forth, such as particular embodiments, data flows, signaling implementations, interfaces, techniques, etc. in order to provide a thorough understanding of the present invention. However, it will be apparent to one skilled in the art that the present invention may be practiced in other embodiments that depart from these specific details. For example, while the present invention is described in the context of an example cellular telephone network using GSM terminology, those skilled in the art will appreciate that the present invention can be implemented in any cellular telephone system. In other instances, detailed descriptions of well-known methods, interfaces, devices, and signaling techniques are omitted so as not to obscure the description of the present invention with unnecessary detail.

Figure 1:
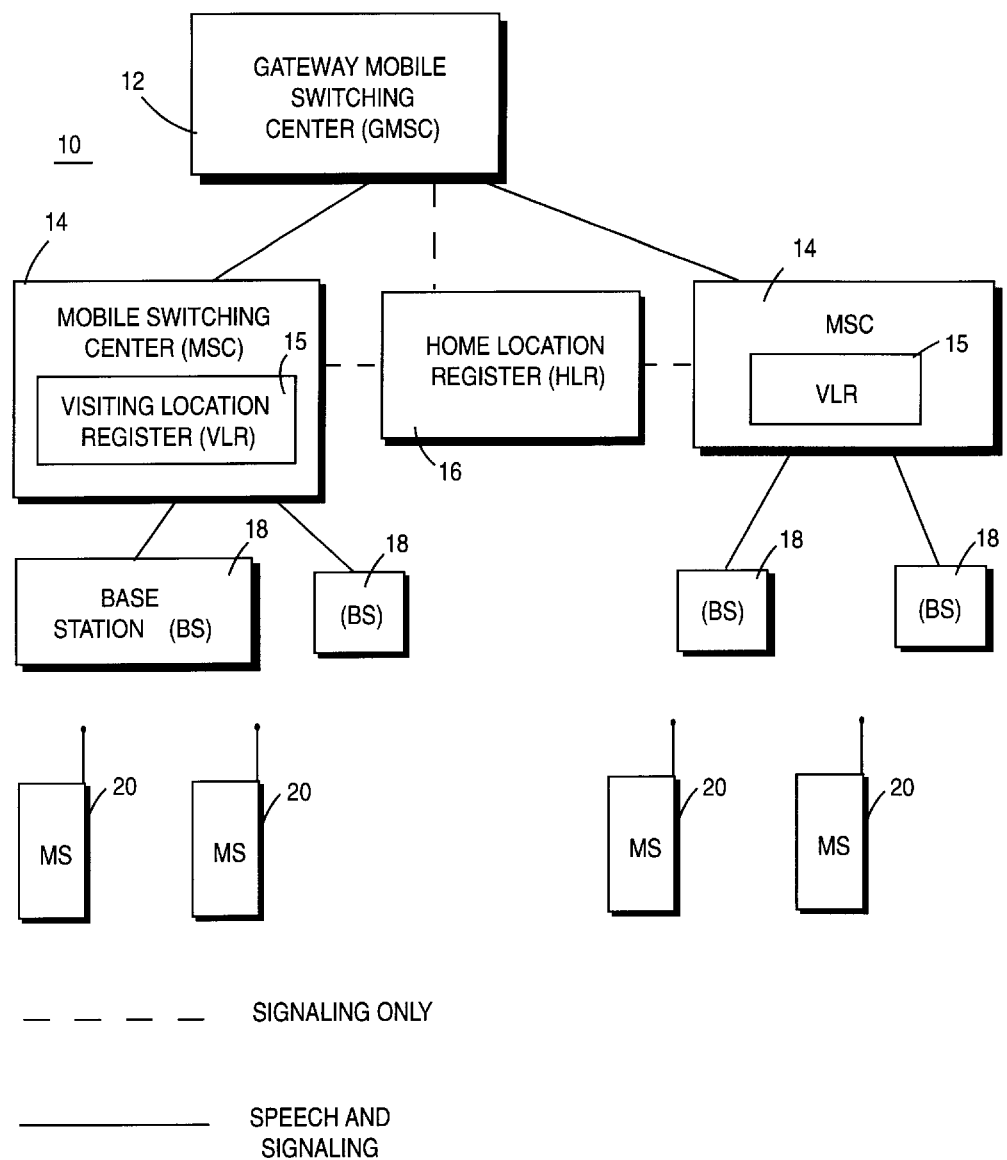
FIG. 1 is a function block diagram in accordance with a first example embodiment of the present invention.

FIG. 1 illustrates an example mobile communications system 10 in which the present invention may be implemented. Mobile communications system 10 includes a gateway mobile switching center (GMSC) 12 which interfaces with other telecommunications networks such as the public switched telephone network (PSTN), ISDN or a cellular network, etc. The gateway mobile switching center 12 is connected to one or more other mobile switching centers (MSC) 14 provided in the mobile communications system 10. The gateway MSC is the point in the public land mobile radio network (PLMN) 10 where calls to mobile subscribers enter. Therefore, each mobile terminating call must be routed via the GMSC 12. The GMSC 12 contains signaling functions for retrieving information from a home location register (HLR) 16 which is needed for a mobile terminating call setup. Based on the results of the interrogation to identify the MSC/VLR currently serving the called mobile station, the call is routed by the GMSC 12 to the serving MSC 14. While the GMSC is shown as a separate node for clarity of illustration, it can be co-located with a MSC/VLR node.

Each mobile switching center 14 performs telephony switching functions associated with calls involving at least one mobile or portable communications unit indicated as mobile stations (MS) 20 in FIG. 1. Included with each mobile switching center 14 is a visiting location register (VLR) 15 which includes a database containing information about all mobile stations currently located in that MSC's service area. The VLR 15 contains temporary subscriber information needed by the MSC 14 to provide services to visiting/roaming mobile subscribers. When a mobile station roams into a new MSC service area, the VLR associated with that MSC requests data about the mobile station from the home location register (HLR) 16 and stores it. Thus, if the roaming mobile station makes a call, the VLR already has the information needed for call setup. The visiting location register 15 may also be a stand-alone node. But in the presently preferred example embodiment, the VLR 15 is integrated with the MSC 14 to eliminate signaling between the two nodes over a network, i.e., internal signaling is used thereby decreasing the signaling load over the network.

The home location register 16 is a database that stores and manages subscriptions. For each "home" mobile subscriber, the HLR contains permanent subscriber data such as a Mobile Station ISDN number (MSISDN) which uniquely identifies the mobile telephone subscription in the public switched telephone network numbering plan and an International Mobile Subscriber Identity (IMSI) which is a unique entity allocated to each subscriber and is used for all signaling in the PLMN 10. All network related subscriber information is connected to the IMSI. The HLR 16 also contains a list of services which a mobile subscriber is authorized to use along with a current subscriber location number corresponding to a VLR address. The HLR may be integrated in the same node as the MSC/VLR or can be implemented as a separate node as indicated in the example embodiment shown in FIG. 1.

Once the serving MSC/VLR node is identified, a call intended for one of the mobile stations 20 is routed by that serving MSC/VLR to the base station 18 associated with the cell in which the called mobile station 20 is currently located. Using well-known, established protocols and procedures, the call is forwarded over the radio interface by that base station 18 to the called mobile station 20.

The general procedures for routing a call to a mobile station in the PLMN 10 is now described. Assume for example that a call is placed from a calling party "A" to a called party "B" corresponding to one of the mobile stations 20 in PLMN 10. Thus, the numbered dialed by "A," i.e., the mobile station ISDN number (MSISDN), is analyzed in a PSTN exchange which determines that the call is for a mobile subscriber. The call is routed to the nearest GMSC 12 in the home PLMN 10 of the called mobile B.

After analyzing the MSISDN for the routed call, the GMSC 12 sends a signaling message to the HLR 16 requesting information to be used to route the call to the serving MSC/VLR where the mobile station is temporarily registered. Using the MSISDN, the HLR 16 retrieves the IMSI and a data record for the mobile subscriber B. Since the address of the serving VLR for this mobile was received when the mobile registered in the PLMN 10, the HLR 15 contacts the serving VLR to obtain a roaming number. The VLR sends the roaming number to the HLR 15, and the HLR forwards the roaming number to the GMSC 12 which enables the GMSC to then route the actual call to the serving MSC 14. Since the MSC knows the location area where the mobile station is located, it sends a paging message and the call to the mobile in accordance with known procedures.

Figure 2:
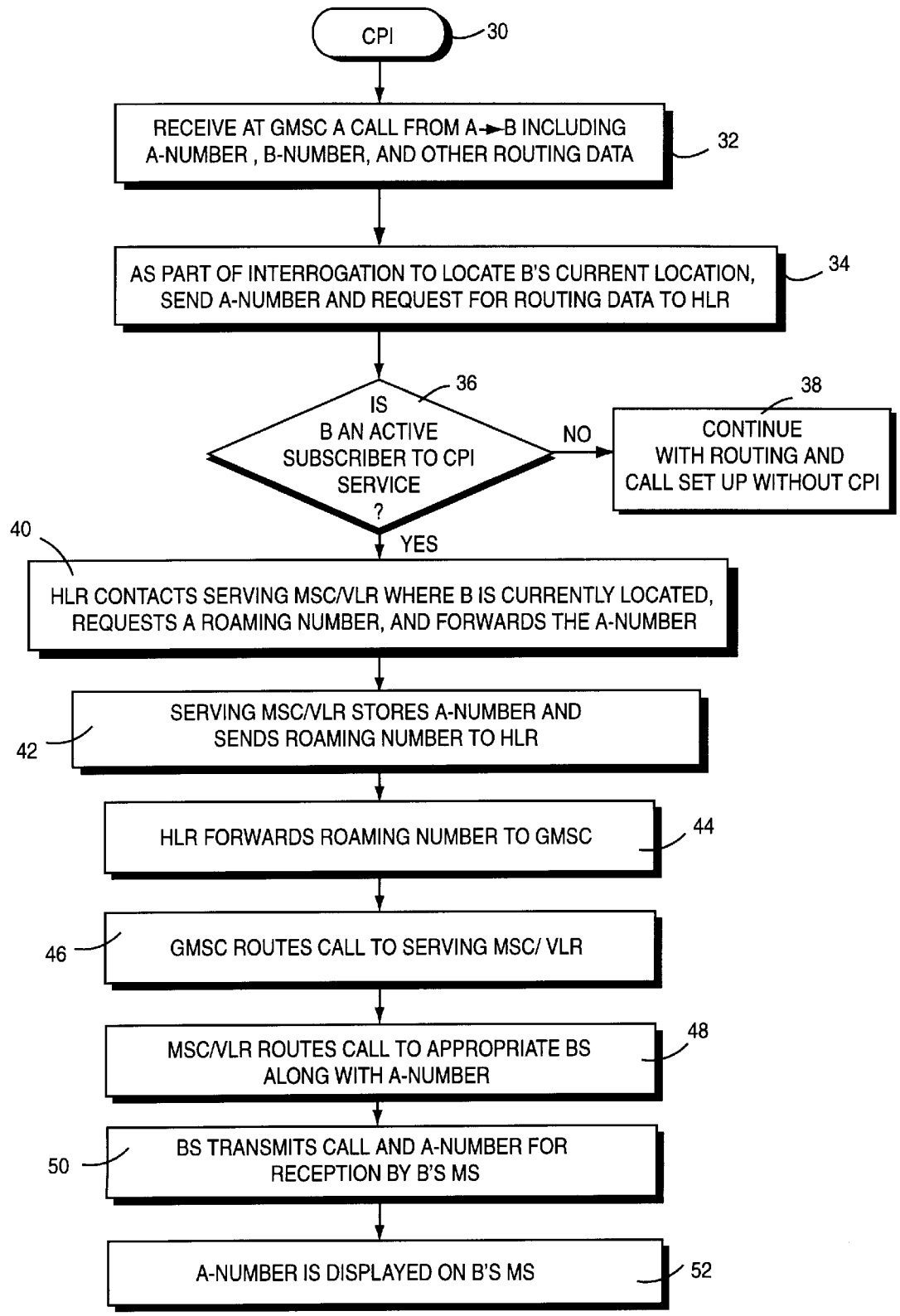
FIG. 2 is a flowchart diagram illustrating example procedures implementing the present invention in accordance with the embodiment shown in FIG. 1.

If a mobile subscriber subscribes to a calling party identification (CPI) service, then the procedures outlined in CPI routine 30 illustrated in FIG. 2 are followed. A call from party A to party B is received at the GMSC 12 including the A number, B number, and other routing information (block 32). As part of the GMSC's interrogation procedure to locate "B's" current location, the GMSC 12 sends the A number along with the normal request for routing information to the HLR 16 (block 34). A decision is made (block 36) whether party B is an active subscriber to the CPI service. In this example embodiment, this determination is made in the HLR node 16 by checking "B's" subscriber data record(s) to determine whether a CPI flag is set. If the CPI flag is not set, meaning that B does not currently subscribe to the CPI service, the routing and call setup procedures described above are executed (block 38).

However, if B currently subscribes to the CPI service, when the HLR contacts the serving MSC/VLR node where B is currently located requesting a roaming number, the HLR also forwards the A number to the serving MSC/VLR (block 40). The serving MSC/VLR stores the A number and sends the requested roaming number to the HLR (block 42). The HLR forwards the received roaming number to the GMSC (block 44), and the GMSC routes the call to the serving MSC/VLR (block 46). The serving MSC/VLR then routes the call to the appropriate base station along with the previously received A number (block 48). The base station transmits the call and the A number for reception by B's mobile station (block 50). B's mobile station then displays the A number when the call is received over the radio link (block 52).

Using this procedure, mobile subscribers roaming in a foreign/visiting mobile network may regardless of the signaling capabilities supported between the GMSC and the MSC/VLR reliably receive the calling party identification service. That is, the invention provides a solution that overcomes technical or administration related limitations currently often occurring when a mobile subscriber is roaming in a foreign country.

Figure 3:
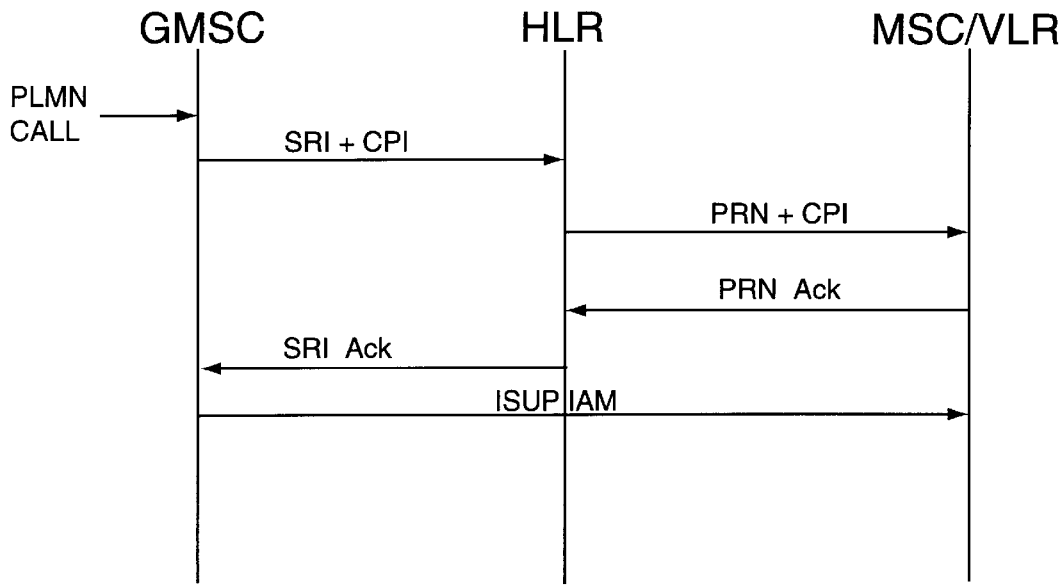
FIG. 3 is a partial signaling diagram showing relevant signals which may be used to implement the present invention in the first embodiment in a Signaling System Number 7 (SS7) environment.

A signaling diagram showing SS7 signaling as an example for implementing the present invention in a GSM type PLMN is illustrated in FIG. 3. At the physical, data, and network layers, SS7 employs message transfer part (MTP) levels 1, 2, and 3, respectively. Network layer functions are also implemented using a signaling connection control part (SCCP) for some applications. Possible applications relative to mobile communications systems like GSM include telephone user part (TUP), ISDN user part (ISUP), mobile application part (MAP), transaction capabilities application part (TCAP), and transaction capabilities (TC) among others.

Referring to FIG. 3, when a PLMN call is received at the GMSC, a send routing information (SRI) message is sent along with calling party identification (CPI) information, i.e., the A number, to the HLR. The HLR sends the CPI in addition to a "provide routing number" (PRN) message to the serving MSC/VLR. The serving MSC/VLR sends an PRN acknowledgment signal back to the HLR which in turn sends an SRI acknowledgment signal from the HLR to the GMSC. An ISUP initial address message (IAM) or equivalent message in other signaling systems is then sent from the GMSC to the serving MSC/VLR for routing the call from the GMSC to the serving MSC/VLR. Thus, the present invention may be readily implemented using existing signaling systems with only minor modifications to signaling between the GMSC, HLR, and serving MSC/VLR nodes.

Figure 4:
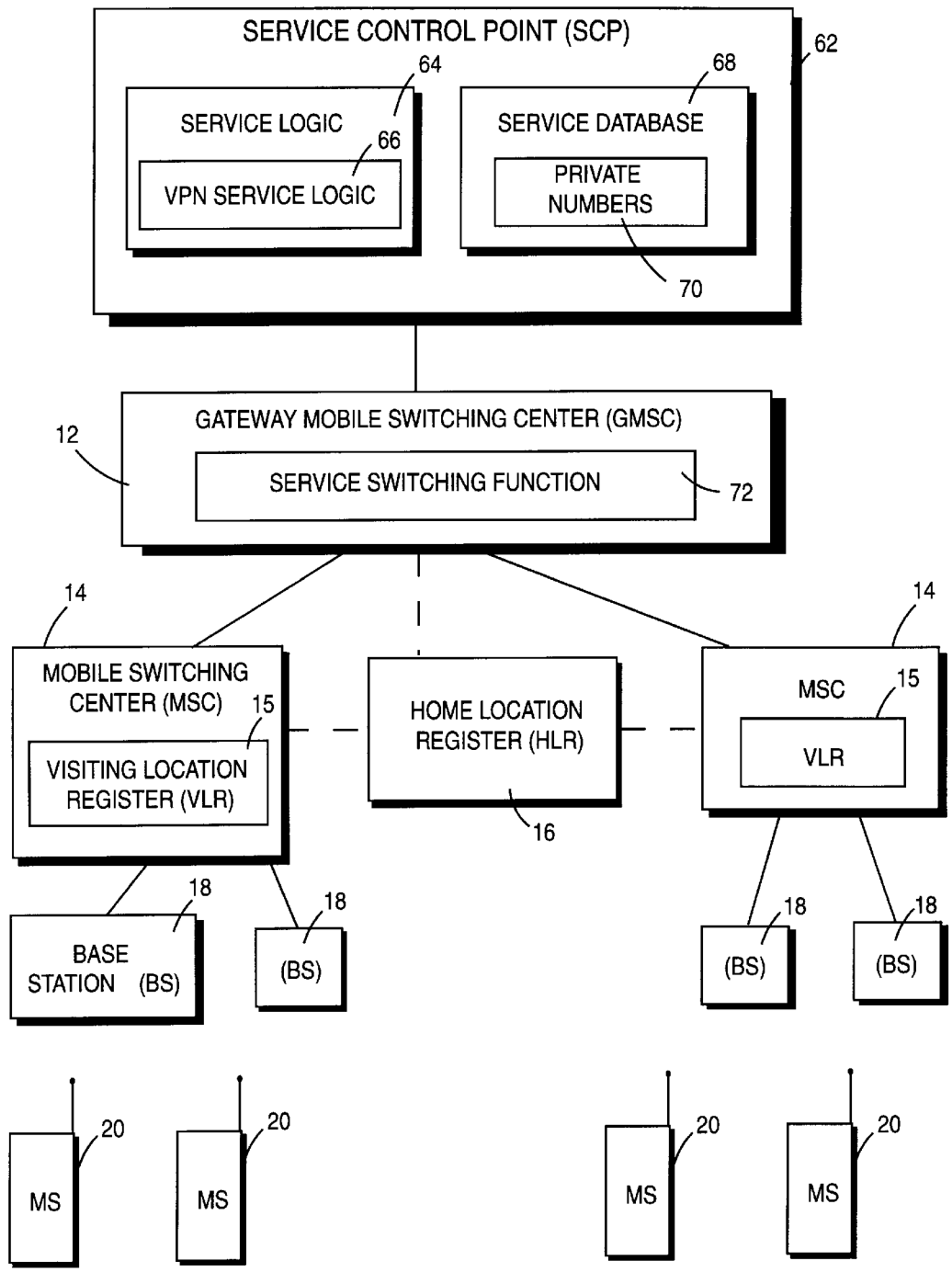
FIG. 4 is a second example embodiment of the present invention as applied to virtual private networks (VPNs)

The present invention may also be advantageously applied to provide a calling party identification service for mobile subscribers which also are part of a private numbering plan. For purposes of illustration only, such a private numbering plan is described in the context of a virtual private network (VPN). Reference is now made to the function block diagram shown in FIG. 4 where like reference numbers refer to like elements from FIG. 1.

One example implementation of a VPN service may employ intelligent network (IN) or advanced intelligent network (AIN) type model. The Customized Applications for Mobile network Enhanced Logic (CAMEL) referred to in the background is one such implementation.

The gateway mobile switching center 12 includes a functional entity called a service switching function (SSF) 72 that interfaces the GMSC 12 to a service control point (SCP) 62. The service switching function 72 is similar to that used in intelligent networks but uses different triggering mechanisms consistent with PLMNs. The points in the call processing at which service logic processing may be necessary are triggered by detection points (DP). Service control point 62 includes service logic 64 corresponding to affected services. In this illustration, VPN service logic 66 is shown specifically. A service database 68 is used by the service logic, and again in accordance with this specific illustration, includes private numbering plan telephone numbers 70.

When a mobile destined/terminating call is received in the PLMN at the GMSC 12, and possibly an interrogation to the HLR being made the service switching function determines if a service of IN type shall be triggered. The GMSC/SSF determines that the service will be triggered by either analyzing call data such as the destination number or by analyzing an indication from HLR 16 that the called party B has a terminating IN based service. As a result, the service switching function 72 initiates a query to the service control point 62. The A number, B number, and other call data are sent from the GMSC/SSF to the service control point 62. The service control point 62 analyzes the query and invokes the VPN service logic 66. Using the private numbering plan database 70, the VPN service logic 66 translates the conventional A-number to a corresponding, private A-number from the private numbering plan database 70. For example, the private A-number may be a so-called short number with only four or five digits. Other calling party identifications may be employed including a subscriber name, extension, etc. The private A-number is returned to the GMSC/SSF, and the GMSC initiates interrogation and routing procedures similar to those described in conjunction with FIG. 2.

Figure 5:
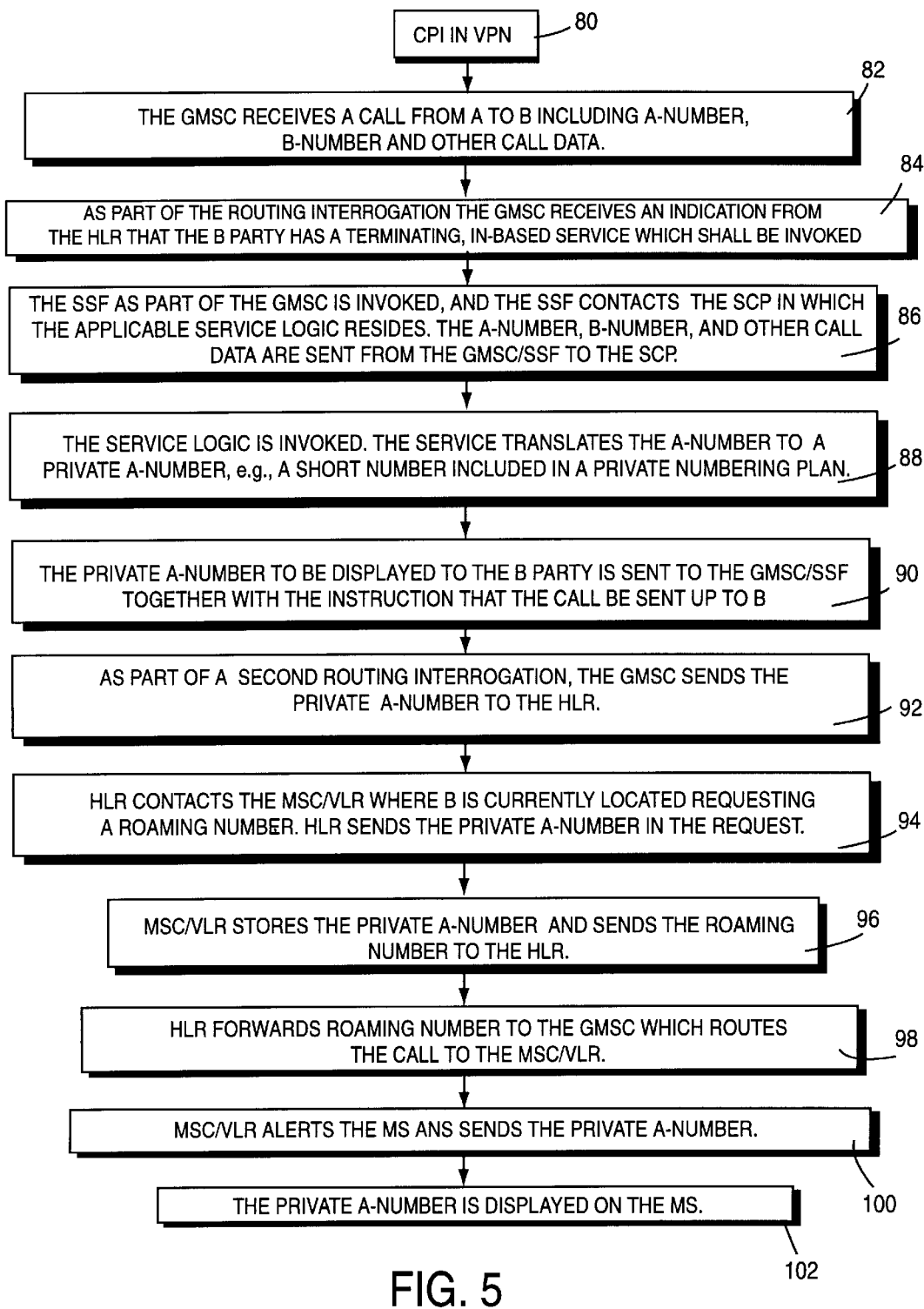
FIG. 5 is a flowchart diagram illustrating example procedures for implementing the second embodiment of the present invention.

FIG. 5 is a flowchart diagram outlining a calling party identification (CPI) service in virtual private network (VPN) routine 80 in accordance with an example application of the present invention. The GMSC receives a call from party A to mobile subscriber B including A-number, B-number, and other call data (block 82). In this example, called party B subscribes to the virtual private network which includes a private numbering plan with some type of private identification information being associated with party B. As part of an initial routing interrogation procedure, the GMSC receives an indication from the HLR that party B has a terminating, IN-based service which needs to be invoked (block 84). The service switching function (SSF), is then invoked and queries the SCP forwarding the A-number, B-number, and other call data (block 86).

The VPN service logic is invoked by the SCP to translate the A-number to a private A-number (block 88). The private A-number is returned to the GMSC/SSF together with an instruction that the call should be set up to B (block 90). The GMSC sends the private A-number to the HLR 16 (block 92). The HLR contacts the MSC/VLR node servicing the area where B is currently located and requests a roaming number. The HLR also sends the private A-number to the serving MSC/VLR (block 94). The serving MSC/VLR stores the private A-number and the roaming number and sends the roaming number to the HLR (block 96). The HLR forwards the roaming number to the GMSC which routes the call to the serving MSC/VLR (block 98). The serving MSC/VLR alerts the called mobile station, sends the private A-number (block 100), and the private A-number is displayed on B's mobile (block 102).

Figure 6:
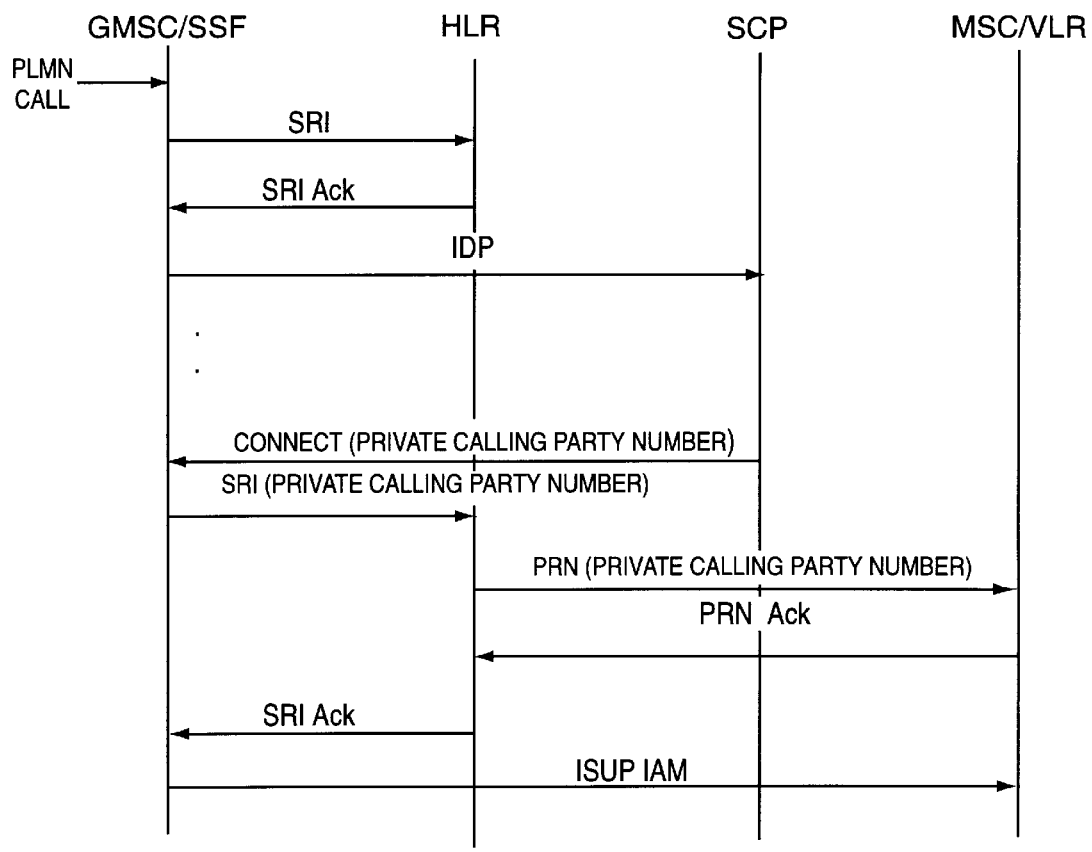
FIG. 6 shows a partial signaling diagram which may be used in implementing the second embodiment of the present invention in an SS7 environment.

As in the first embodiment, this second example embodiment of the present invention may be readily implemented using existing SS7 signals employed in GSM-type PLMNs as illustrated in the signaling diagram in FIG. 6. The incoming PLMN call is received at the GMSC/SSF node. A send routing information (SRI) signal is sent to the HLR using the mobile application part (MAP) protocol. Assuming the SRI signal was received, the HLR sends an acknowledgment back to the GMSC/SSF which in turn sends an initial detection point (IDP) message using INAP/CAP protocol to the service control point to trigger the VPN service. The service control point performs the necessary translation of the A-number into a private number and returns that private number to the GMSC. The GMSC couples the private number received from the service control point with the send routing information (SRI) message to the HLR. The HLR forwards the private calling party number along with the provided routing number message (PRN) to the serving MSC/VLR. The serving MSC/VLR acknowledges the PRN signal to the HLR which in turn acknowledges the SRI signal to the GMSC. An initial address message (IAM) in accordance with the ISUP protocol is then forwarded from the GMSC to the serving MSC/VLR.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a mobile communications network including an initial routing node and one or more mobile switching nodes for directing calls to a plurality of mobile communications units and a mobile subscriber database connected to the initial routing node and the plurality of mobile switching nodes, a method comprising the steps of:

placing a call from a calling party to one of the mobile communications units;

detecting a calling party identification of the calling party at the initial routing node;

determining the mobile switching node currently serving the one mobile communications unit;

sending the calling party identification to the mobile subscriber database from the initial routing node;

providing the calling party identification from the mobile subscriber database to the serving mobile switching node; and providing the calling party identification with the call from the mobile switching node for delivery to the one mobile communications unit.

2. The method in claim 1, wherein the mobile communications network includes one or more base stations connected to each mobile switching node, wherein the sending step further comprises:

forwarding the calling party identification to one of the base stations, the one base station transmitting the calling party identification to the one mobile communications unit.

3. The method in claim 1, the method further comprising:

sending an additional calling parameter to the mobile subscriber database from the initial routing node.

4. The method in claim 1, wherein the mobile subscriber database is a home location register (HLR) node storing mobile unit identification, subscription, and location information for a plurality of home mobile stations and each mobile switching node is associated with a visiting location register (VLR) storing mobile unit identification, subscription, and location information for a plurality of visiting mobile stations, the method further comprising:

the initial routing node sending to the HLR the calling party identification as part of an interrogation of the HLR for information to route the call to the serving mobile switching node;

the HLR sending to the VLR of the serving mobile switching node the calling party identification, and obtaining from the VLR of the serving mobile switching node a roaming number associated with the one mobile unit; the VLR storing the calling party identification together with the roaming number;

forwarding the roaming number from the HLR to the initial routing node; and the initial routing node routing the call to the serving mobile switching node using the roaming number.

5. The method in claim 1, wherein each mobile communications units includes a display, the method further comprising:

presenting the calling party identification at the one mobile communications unit.

6. The method in claim 1, further comprising:

determining whether the one mobile communications unit has a corresponding subscription to a calling party presentation service offered by the mobile communications network.

7. The method in claim 1, wherein the calling party identification is a telephone number.

8. The method in claim 1, wherein the calling party identification is a private number from a numbering plan telephone number.

9. The method in claim 1, wherein the initial routing node is a gateway mobile switching center.

10. The method in claim 1, wherein the call is handled across different mobile communications networks.

11. The method in claim 1, wherein the call is handled by mobile communications networks from more than one country.

12. The method in claim 1, wherein the one mobile communications unit is roaming in a foreign mobile communications network when the call is placed.

13. Apparatus for providing a calling party identification service in a mobile communications network comprising:

an initial call routing node;

a plurality of mobile switching nodes coupled to the initial routing node for directing calls to mobile communications units;

a mobile subscriber database coupled to the initial routing node and the mobile switching nodes; and the initial routing node receiving a call for a mobile communications unit currently located in the mobile communications network, detecting a calling party identification of the calling party, determining which of the mobile switching nodes is currently serving the mobile communications unit, and using the mobile subscriber database to send the detected calling party identification to the mobile switching node currently serving the one mobile communications unit for delivery to the mobile communications unit.

14. The apparatus in claim 13, wherein the call is handled across different mobile communications networks.

15. The apparatus in claim 13, wherein the call is handled by mobile communications networks from more than one country.

16. The apparatus in claim 13, wherein the one mobile communications unit is roaming in a foreign mobile communications network when the call is placed.

17. The apparatus in claim 13, wherein the mobile communications network further comprises:

one or more base stations connected to each mobile switching node, wherein the serving mobile switching node forwards the calling party identification to one of the base stations, and the one base station transmits the calling party identification to the mobile communications unit.

18. The apparatus in claim 13, wherein the initial call routing node sends the calling party identification to the mobile subscriber database from the initial call routing node and the mobile subscriber database provides the calling party identification to the serving mobile switching node.

19. The apparatus in claim 13, wherein the mobile subscriber database is a home location register (HLR) node storing mobile unit identification, subscription, and location information for a plurality of home mobile units and each mobile switching node is associated with a visiting location register (VLR) storing mobile unit identification, subscription, and location information for a plurality of visiting mobile units, wherein the initial routing node sends the HLR the calling party identification as part of an interrogation of the HLR for information to route the call to the serving mobile switching node, and wherein the HLR sends to the VLR of the serving mobile switching node the calling party identification and obtains a roaming number associated with the called mobile unit.

20. The apparatus in claim 13, wherein the initial call routing node is a mobile switching node.

21. The apparatus in claim 13, wherein the calling party identification is a private number associated with a private numbering plan service to which the one mobile communications unit is a subscriber.

* * * * *